United States Patent
Yakymyshyn

(10) Patent No.: US 7,355,776 B2
(45) Date of Patent: Apr. 8, 2008

(54) ACOUSTIC DAMPING MATERIAL FOR ELECTRO-OPTIC MATERIALS

(75) Inventor: Christopher P. Yakymyshyn, Seminole, FL (US)

(73) Assignee: Tektronix, Inc., Beaverton, OR (US)

( * ) Notice: Subject to any disclaimer, the term of this patent is extended or adjusted under 35 U.S.C. 154(b) by 467 days.

(21) Appl. No.: 11/077,708

(22) Filed: Mar. 10, 2005

(65) Prior Publication Data

US 2005/0199438 A1    Sep. 15, 2005

(51) Int. Cl.
*G02F 1/03* (2006.01)
*G02F 1/07* (2006.01)

(52) U.S. Cl. .............. 359/245; 359/249; 359/252; 359/254; 359/260; 359/322; 181/207; 181/208; 181/209

(58) Field of Classification Search .............. 359/245, 359/249, 252, 254, 260, 321–323; 181/207–209
See application file for complete search history.

(56) References Cited

U.S. PATENT DOCUMENTS

| 3,729,250 A * | 4/1973 | Kusters et al. .............. 359/321 |
| 6,402,565 B1 | 6/2002 | Pooley |
| 6,629,048 B1 | 9/2003 | Law |

OTHER PUBLICATIONS

"Polymer G'vulot," I-Tech USA, International Technologies, LLC (website: polymer-usa.com), copyright date: 2003, pp. 1-4 (as printed).*

* cited by examiner

*Primary Examiner*—Evelyn A. Lester
(74) *Attorney, Agent, or Firm*—William K. Bucher

(57) ABSTRACT

An acoustic damping material for electro-optic material has an adhesive material combined with a ceramic crystalline material such that the acoustic impedance of the combined adhesive material and the ceramic crystalline material is substantially the same as the acoustic impedance of the electro-optic material.

9 Claims, 4 Drawing Sheets

ACOUSTIC DAMPING MATERIAL FOR ELECTRO-OPTIC MATERIALS

BACKGROUND OF THE INVENTION

The present invention relates generally to electro-optic materials and more particularly to an acoustic damping material for reducing acoustic modes in the electro-optic material.

Electro-optic material is a class of inorganic and organic crystals where the index of refraction of the material changes in response to electro-magnetic energy applied to the material. Such material may be used in the production of optical devices, such as optical switches, optical limiters, optical modulators and the like. In it simplest form, an optical signal, such as the output of a laser or the like, is launched into the electro-optic material having length and widths in the millimeter range and thicknesses in the tenths of millimeter range. The diameter of the optical path of the optical signal within the electro-optic material generally ranges from ten to a few hundreds microns across. Electrodes are formed on opposing surfaces of the electro-optic material that are parallel to the optical path of the signal passing through the electro-optic material. An electrical signal is applied to the electrodes which varies the index of refraction of the electro-optic material as a function of the variations of the electrical signal. The variations of the index of refraction of the electro-optic material alters the optical signal propagating through the electro-optic material.

The strength of the electric field distribution within the electro-optic material is a function of the distance between the opposing electrodes and the amplitude of the applied electrical signal. The strength of the electric field is the inverse of the distance separation of the electrodes. As the distance between the electrodes decreases, the strength of the electric field between them increases. As the distance decreases, the magnitude of the electrical signal can decrease to generate the same amount of change in the index of refraction.

Acoustic modes are generated in electro-optic material as a result of piezoelectric effects of electro-magnetic signals on electrodes connected to the electro-optic material. The piezoelectric effect changes the physical dimensions of the electro-optic material resulting in acoustic distortion that causes optical noise to be imparted in an optical signal generated by the electro-optic material. In an optical cavity, such as a Fabry-Perot cavity, the changes in the physical dimensions of the optical cavity causes variances in the resonance points of the cavity. This results in acoustic distortion that is imparted as optical noise in the modulated optical return signal generated by the Fabry-Perot cavity.

What is needed is an acoustic damping material that reduces acoustic modes in the electro-optic material. Further, the acoustic damping material should prevent unwanted external optical radiation from entering the electro-optic materials and internal optical radiation from exiting the electro-optic material at undesired locations.

SUMMARY OF THE INVENTION

Accordingly, the present invention is an acoustic damping material for electro-optic material having an acoustic impedance. The acoustic damping material has an adhesive material combined with a ceramic crystalline material such that the acoustic impedance of the combined adhesive material and the ceramic crystalline material is substantially the same as the acoustic impedance of the electro-optic material. The adhesive material, such as epoxy, ultra-violet cured epoxy, urethane, silicone or the like, has an acoustic impedance substantially less than the acoustic impedance of the electro-optic material. The ceramic crystalline material, such as yttrium-aluminum-garnet or the like, has acoustic impedance greater than the acoustic impedance of the electro-optic material. In a specific embodiment of the invention for KPT electro-optic material, the adhesive material is an epoxy and the yttrium-aluminum-garnet has a volume in the range of 25% to 50% with the preferred volume being 50%. The acoustic damping material may further include an optical absorbing material for absorbing optical radiation in the form of carbon black.

The objects, advantages and novel features of the present invention are apparent from the following detailed description when read in conjunction with appended claims and attached drawings.

DETAILED DESCRIPTION OF THE PREFERRED EMBODIMENT

Figure 1:
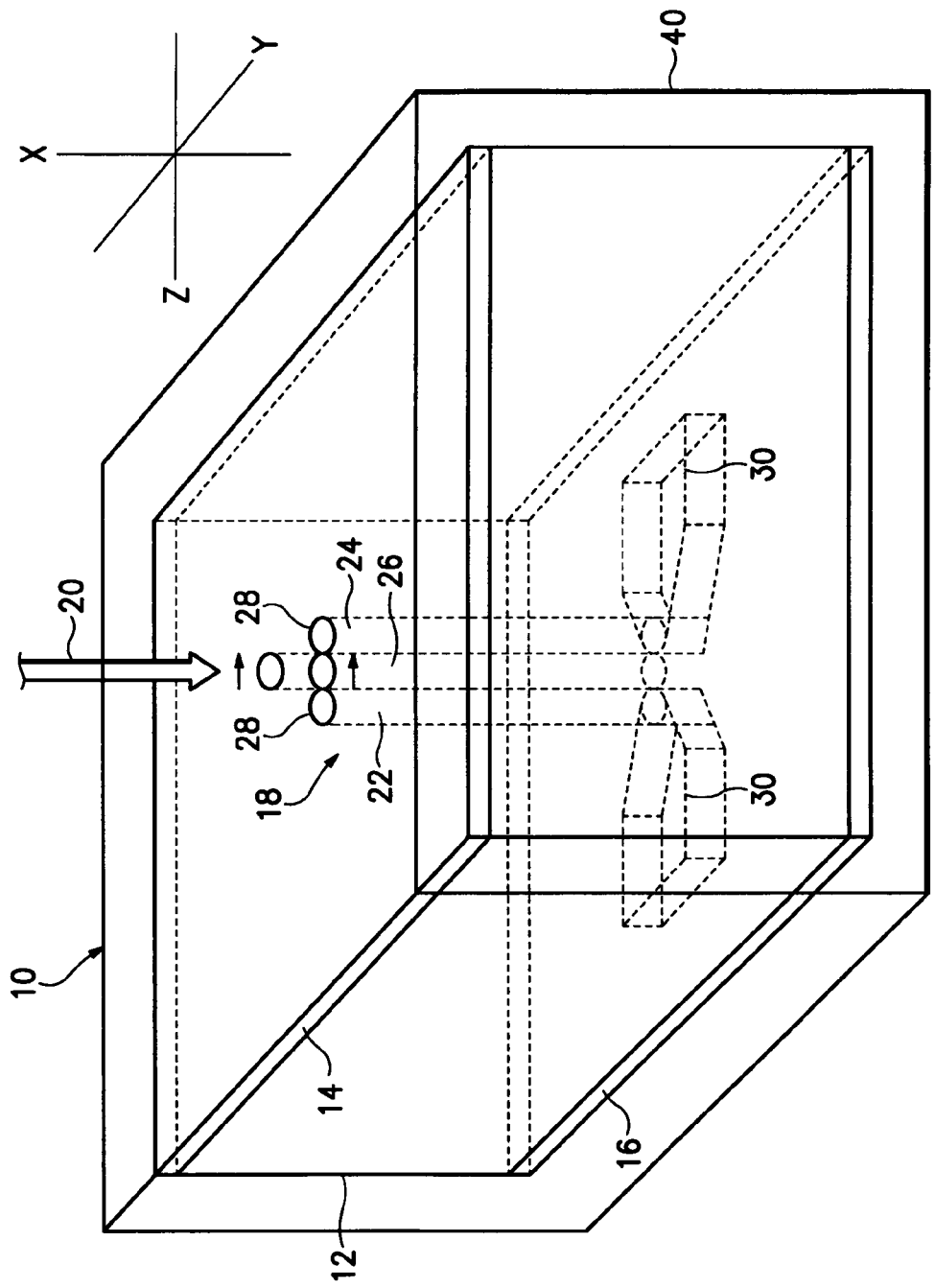
FIG. 1 illustrates an optical cavity having opposing optical reflective materials and an electrode structure that generated acoustic modes in response to an applied electrical signal using the acoustic damping material of the present invention.

Referring to FIG. 1 there is shown a Fabry-Perot optical cavity 10. The optical cavity 10 has an electro-optic material 12 disposed between opposing optically reflective materials 14 and 16. An electrode structure 18 is formed within the optical cavity 10. The electro-optical material may be formed from inorganic and organic materials, such as Potassium Titanyl Phosphate (KTP), Rubidium Titanyl Arsenate (RTA), Rubidium Titanyl Phosphate (RTP), Zinc Telluride (ZnTe), DimethylAmino-methyl Stilbazolium Tosylate (DAST) or other electro-optic materials, such as electro-optic polymers, all having the property of a changing index of refraction in response to an applied electromagnetic field. The inorganic and organic materials have crystallographic axes defining the crystallographic structure of the electro-optic material 12. Crystals systems are cubic, tetragonal, orthorhombic, monoclinic and triclinic. The crystallographic axes for the cubic, tetragonal and the orthorhombic systems are mutually perpendicular to each other. The monoclinic and triclinic crystal systems have one or more of the crystallographic axes at oblique angles to each other. The hexagonal crystal system has two crystallographic axes falling on the same plane at 120° to each other and a third axis orthogonal to the other two. The inorganic and organic materials further have X, Y and Z optical axes which may or may not coincide with the crystallographic axes.

The optical cavity 10 will be described below in relation to inorganic KTP electro-optic material having an orthorhombic crystalline structure and optical axes coincident with the crystallographic axes. It is understood that the optical cavity 10 is applicable to the other crystal structures and organic polymers having one or more optical axes that are responsive to an electromagnetic field for changing the index of refraction of the electro-optic material. Further, the optical cavity will be described in relation to specific optical axes of the KTP electro-optic material 12 and a specific orientation of a propagating optical signal 20 and orientations of the electromagnetic field within the KTP electro-optic material 12. In the preferred embodiment, the KTP electro-optic material 12 is an X-cut crystal face where the cleaved and polished surfaces of the crystal are perpendicular to the optical X-axis. Alternatively, the KTP electro-optic material 12 may be a Y-cut crystal face. The X-cut crystal is preferred over the Y-cut crystal for minimizing distortions from the acoustic modes generated within the electro-optic material 12. It should be noted that the electro-optic properties of other crystallographic structures may result in the preferred cut crystal face being orthogonal to the optical Z-axis producing a Z-cut crystal face.

The optical signal 20 provided to the optical cavity 10 is preferably provided by a coherent optical source, such as a laser diode or the like. The optical signal 20 is polarized as either linear or circular polarized light. The optical signal preferably passes through bulk optic lenses to provide a generally collimated or focused beam onto the optically reflective materials 14. An example of a generally collimated optical signal 20 focused on an electro-optic material is a 1310 nm optical signal having an optical path diameter ranging from approximately 15 to 150 microns. The linear or circular polarization states of the optical signal 20 are normal to the propagation direction of the signal. The lateral dimensions of the optically reflective materials 14 and 16 should exceed the beam diameter of the optical signal 20 impinging on the optical cavity 10. The optically reflective materials 14 is partially reflective to allow the optical signal 20 to enter and exit the optical cavity 10. In certain applications the optical reflective material 16 is preferably totally reflective causing the optical signal to enter and exit through the same optically reflective material 14. The optically reflective materials 14 and 16 are preferably ceramic mirrors formed from layers of zirconium dioxide, silicon dioxide and silicon nitride. It is important in certain applications that the optically reflective materials be non-metallic to reduce capacitive and inductive effects.

The change in the index of refraction of the electro-optic material 12 in the presence of an electro-magnetic field is a function of the orientation of the optical signal propagating in the electro-optic material 12 and the relationship of the polarization state of the optical signal 20 and the electrode structure 18 to the optical axes of the electro-optic material 12. For example, KTP electro-optic material exhibits the highest index of refraction and largest sensitivity response to an electro-magnetic signal when the polarization state of the optical signal 20 and the electro-magnetic field are parallel with the optical Z-axis of the KTP material. However, the KTP electro-optic material exhibits the highest piezoelectric response along the Z-axis, and the lowest piezoelectric response along the X-axis, when the electro-magnetic field is parallel to the optical Z-axis. The piezoelectric effect causes a change in the refractive index of the crystal, but also physically alters the length of the material (or strain) along the three principle crystal axes. To minimize the effect of the piezoelectric strain on the modulated signal, it is desirable to ensure that the smallest change in crystal length occurs along the crystal axis that is perpendicular to the two cavity mirrors attached to the crystal. Therefore, in the preferred embodiment, the polarization state of the optical signal 20 and the electro-magnetic field are parallel with the optical Z-axis, and the optical beam propagates through the crystal parallel to the X-axis to minimize the effects of the acoustic modes in the KTP electro-optic material on the resulting optical modulation.

The electrode structure 18 in FIG. 1 has a pair of apertures 22 and 24 formed in the KTP electro-optic material 12 that are generally parallel to the optical path 26 of the received optical signal 20 propagating through the electro-optic material 12. The KTP electro-optic material 12 has mutually perpendicular optical axes X, Y and Z that coincide with the crystallographic axes of the KTP material. The apertures 22 and 24 are disposed on the opposite sides of the optical path 26 of the propagating optical signal 20 and are oriented parallel to the optical X-axis of the electro-optic material 12. The apertures 22 and 24 are preferably formed as close as possible to the propagating optical signal 20 with the aperture separation, for example, being in the range of 45 to 120 microns. In some applications, the apertures 22 and 24 may extend into the optical path 26 of the propagating optical signal 20. The apertures 22 and 24 in FIG. 1 have a circular shape and are produced using an excimer pulsed laser that can produce apertures of approximately 100 microns in diameter and of varying depth in the electro-optic material 16.

Electrically conductive material 28 is disposed within each of the apertures 22 and 24. The electrically conductive material 28 may take the form of conductive wires shaped to conform to the apertures 22 and 24, conductive material deposited on the inner surfaces of the apertures, conductive epoxy filling the apertures, or the like. The deposited conductive material is preferably gold plated over a layer of chromium. The electrically conductive material 28 preferably extends to the exterior surface of the one of the electro-optic material 16 to allow the electrode structure 10 to be electrically coupled to an electro-magnetic source, such as a voltage source. Alternately, the electrically conductive material 28 may be connecting terminals for the voltage source where the ends of the terminals are inserted into the apertures 22 and 24. In a further alternative, the electrically conductive material 28 may reside totally within the electro-optic material 12 and the connecting terminals are inserted into the apertures 22 and 24 to make contact with the electrically conductive material 28. Forming the electrode structure 10 within the optical cavity 10 decreases the distance between the electrodes thus increasing the strength of the electric field applied across optical path 26 of the propagating optical signal 20. This increases the sensitivity of the electro-optic material 12 to the applied electric field.

In a specific embodiment where the electrically conductive material 28 is an electrically conductive epoxy, the apertures 22 and 24 extend through the optical cavity 10 and the electrically conductive epoxy fills the apertures 22 and 24. Filter paper is positioned on one side of the optical cavity 10 covering the apertures 22 and 24. A vacuum is applied to this side of the optical cavity 10 and the electrically conductive epoxy is applied to the apertures 22 and 24 on the other side of the optical cavity 10. The vacuum causes the electrically conductive epoxy to be drawn into the apertures 22 and 24. The filter paper prevents the electrically conductive epoxy from being drawn out of the apertures 22 and 24.

Electrically conductive contacts 30 are formed on the exterior surface of the optically reflective material 18 using well know deposition techniques, such as thin and thick film processes. The electrically conductive contacts 30 are preferably formed of gold deposited over a layer of chromium.

In the preferred embodiment, the separation between the electrically conductive contacts 30 is in the range of 15 to 100 microns with the apertures 22 and 24 set slightly back from the apexes of the contacts 30.

An acoustic damping material 40 is applied to substantially all of the surfaces of the Fabry-Perot optical cavity 10 leaving gaps for the optical signals entering and leaving the optical cavity 10 and for the electrically conductive contacts 30. The acoustic damping material 40 is made of an adhesive material, such as epoxy, ultraviolet cured (UV) epoxy, urethane, silicone or the like doped with a ceramic crystalline material, such as yttrium-aluminum-garnet or the like. The acoustic impedance of the adhesive material is generally substantially less than the acoustic impedance of the electro-optic material 12 in the Fabry-Perot optical cavity 10 whereas the acoustic impedance of the ceramic crystalline material is substantially higher than the electro-optic material 12. The blend of the adhesive material and the ceramic crystalline material is formulated to match the acoustic impedance of the electro-optic material 12 in the optical cavity. For the Fabry-Perot optical cavity 10 having KTP electro-optic material, the acoustic damping material 40 using epoxy as an adhesive has between 25% and 50% by volume of yttrium-aluminum-garnet ceramic crystalline material with the preferred volume being 50%. The use of other types of adhesive material and other types of ceramic crystalline material will alter the volume percentage of the ceramic crystalline material. Further, the use of other types of electro-optic material 12 having different acoustic impedances requires different percentages or types of ceramic crystalline material. An optical absorbing material, such as carbon black, may be added to the acoustic damping material 40 to absorb optical radiation escaping the optical cavity and to prevent extraneous optical radiation from entering the optical cavity.

Figure 2:
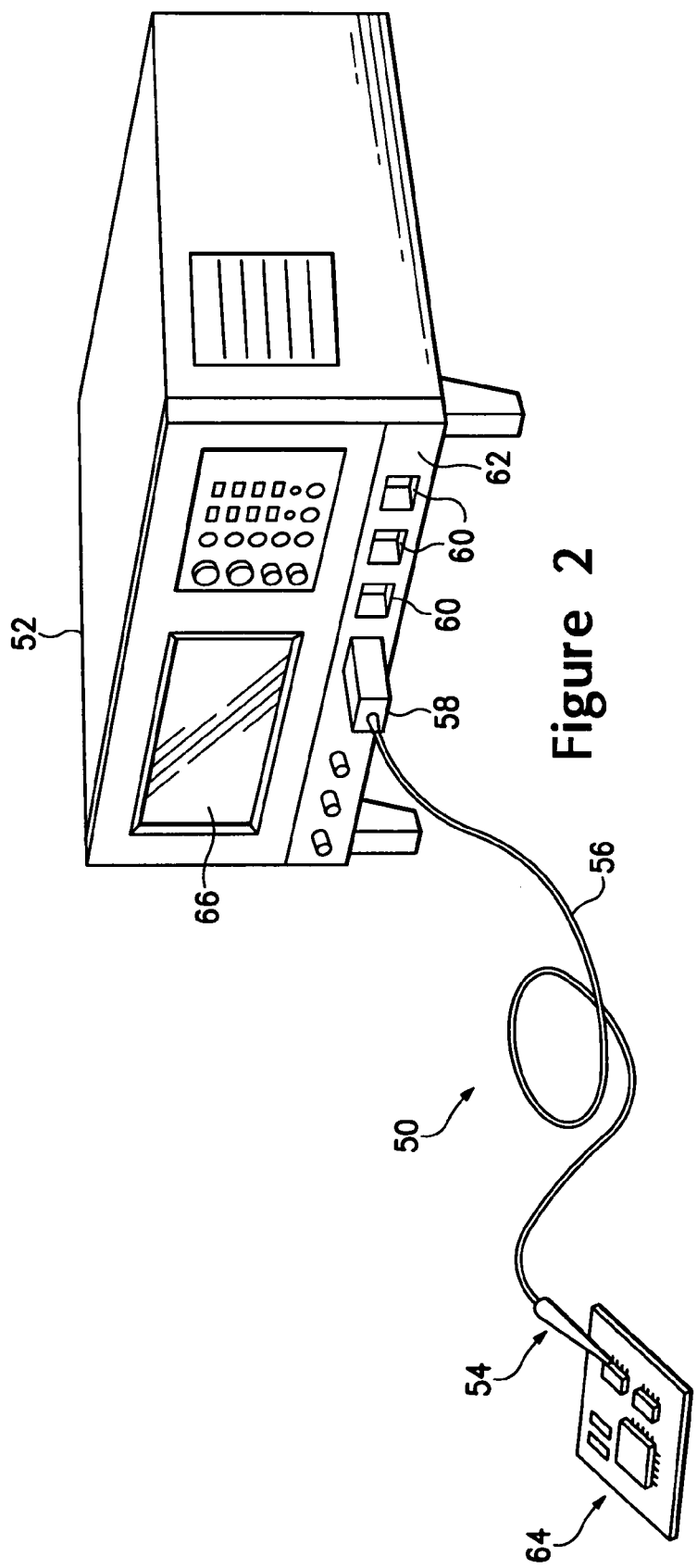
FIG. 2 illustrates a signal acquisition probing system using the optical cavity using the acoustic damping material of the present invention.

Referring to FIG. 2, there is illustrated a signal acquisition probing system 50 coupled to a measurement instrument 52, such as real-time or sampling oscilloscopes, logic analyzer, vector network analyzer, or the like. The signal acquisition probing system 50 has a probing head 54 containing the optical cavity 10 and an optical transmission system 56 extending from the probing head 54 to a probe interconnect housing 58. The probe interconnect housing 58 contains signal acquisition probing circuitry needed to provide an optical signal to the probing head 54 and convert the returning modulated optical signal to an electrical signal. The optical transmission system 56 preferably includes one or more optical fibers. The probe interconnect housing 58 is removably connected to one of several interconnect receptacles 60 on the front panel 62 of the measurement instrument 52. The probe interconnect housing 58 and interconnect receptacles 60 are preferably TekConnect® interface devices such as described in U.S. Pat. No. 6,402,565 and incorporated herein in its entirety by reference. The TekConnect® interface has connections for coupling a wide bandwidth signal to measurement instrument, providing electrical power from the measurement instrument 52 to the probe interconnect housing 58 and communication signals between the measurement instrument 52 to the probe interconnect housing 58 as described in U.S. Pat. No. 6,629,048 and incorporated herein in its entirety by reference. The electrical signal representing the measured signal from a device under test 64 is coupled to acquisition circuitry within the measurement instrument 52 that converts the electrical signal into digital data values and stores the data values in memory. Processing circuitry operating under program control processes the digital data values to produce display data that is displayed on a display device 66, such as a liquid crystal display, cathode ray tube or the like. Alternately, the measurement instrument 52 may include the signal acquisition probing circuitry. The probe interconnect housing 58 would then include one or more optical connectors for coupling the optical signal to the probing head 54 and the return modulated optical signal to the measurement instrument 52.

The signal acquisition probing circuitry has an optical transmitter, optical receiver and control circuitry for the optical transmitter and receiver. The optical output from the optical transmitter and the optical input to the optical receiver are preferably coupled directly to the probing head 54 via individual optical fibers bundled in the optical transmission system 56. To maintain the polarization state of the optical signal from the optical transmitter, the optical fiber is a polarization maintaining optical fiber. Data/control and voltage power lines couple the signal acquisition probing circuitry in the probe interconnect housing 58 to the measurement instrument 52. A high speed coaxial interconnect couples the electrical signal from the optical receiver to the measurement instrument 52.

Figure 3:
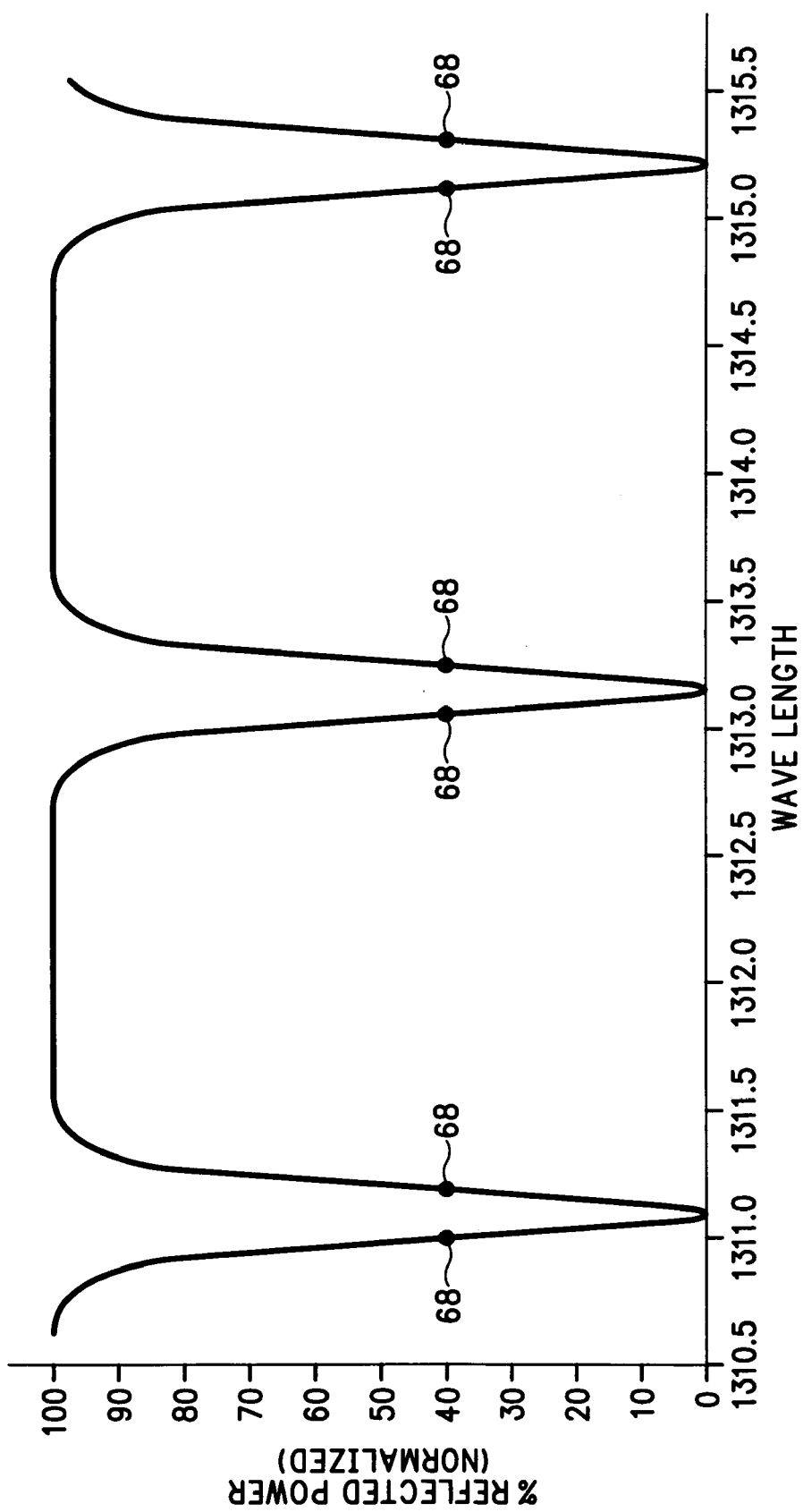
FIG. 3 illustrates the resonate wavelengths for a Fabry-Perot cavity used in the signal acquisition probing system.

The Fabry-Perot optical cavity 10 has a Free Spectral Range of 2-4 nanometers using KTP electro-optic material having an index of refraction of 1.86 parallel to the optical Z-axis and a thickness along the optical X-axis of 0.1 to 0.2 millimeters. The Fabry-Perot optical cavity 10 has multiple resonances defined by the Free Spectral Range. FIG. 3 illustrates the resonate wavelengths for the above described Fabry-Perot optical cavity with the horizontal axis in wavelength and the vertical axis in the normalized reflected power of the Fabry-Perot optical cavity at the input to an optical receiver. As is shown in the graph, the reflected optical power drops steeply from one-hundred percent reflected optical power to essentially zero percent optical power at the resonance points. Optimum modulated reflected power from the Fabry-Perot optical cavity is achieved on the slope of the resonance curve as representatively shown at points 68. This characteristic of the Fabry-Perot optical cavity is used in the implementation of the signal acquisition probing system 50. The Fabry-Perot optical cavity generates a modulated optical signal in response to a measured electrical signal from the device under test 64. The changes in the physical dimensions of the Fabry-Perot optical cavity 10 caused by the acoustic modes of the electro-optic material 12 causes variances in the resonance points of the cavity. This results in acoustic distortion that is imparted as optical noise in the modulated optical return signal generated by the Fabry-Perot optical cavity 10.

Figure 4:
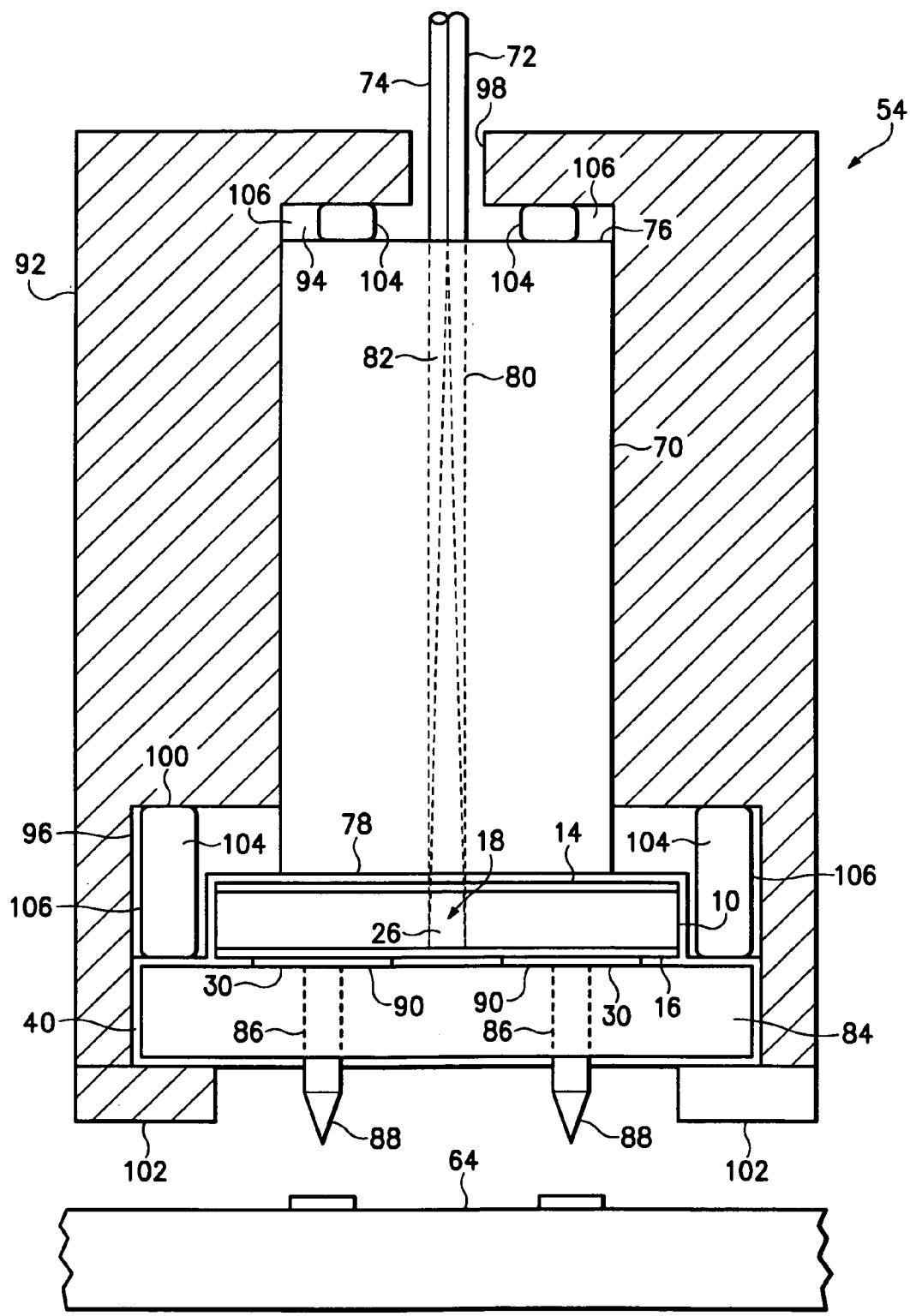
FIG. 4 illustrates a partially sectioned view of the probing components within the probing head in the signal acquisition probing system using the acoustic damping material of the present invention.

FIG. 4 is a partially sectioned view illustrating the probing components within the probing head 54. The probing components include a collimating lens 70, such as manufactured and sold by Koncent under Part No. KPMT-A-400-1310-Y-0.5-G-N. The collimating lens 70 has a length of approximately 0.25 inches and a diameter of approximately 0.1 inches. Optical fibers 72 and 74 from the optical transmission system 56 are disposed adjacent to the top flat surface 76 of the collimating lens 70. The Fabry-Perot optical cavity 10 is secured to the opposing bottom surface 78 of the collimating lens using a non-conductive adhesive, such as epoxy or the like. The preferred structure of the Fabry-Perot optical cavity 10 is essentially the same as previously described.

The Fabry-Perot optical cavity 10 has the electrode structure 18 with electrically conductive contacts 30 formed on the bottom exterior surface of the cavity 10. The reflective coating 14 and 16 on the top and bottom surfaces of the Fabry-Perot optical cavity 10 are formed of the previously described non-conductive materials. It is important in probing applications to minimize conductive materials near the Fabry-Perot optical cavity 10 to limit inductive and capacitive interference in the operation of the optical cavity. The Fabry-Perot optical cavity 10 has a preferred length along the optical Z-axis of 1 mm, a width along the optical Y-axis of 1 mm and a thickness along the optical X-axis of 0.1 mm to 0.2 mm. The optics in the collimating lens 70 produces a collimated beam 80 from the optical fiber 72 that is focused along the optical path 26 substantially parallel to the electrode structure 18 in the Fabry-Perot optical cavity 10. The modulated optical signal generated within the Fabry-Perot optical cavity 10 exits through the reflective coating 14 and is coupled into the collimating lens 70, which produces a focused beam 82 on the optical fiber 74.

Disposed adjacent to the bottom surface of the Fabry-Perot optical cavity 10 is a probe contact substrate 84 for supporting probing contacts, such as contact pads and probing tips. The probe contact substrate 84 is preferably formed of a non-conductive material, such as alumina, circuit board material or the like. In one embodiment, the probe contact substrate 84 has apertures 86 formed therein for receiving electrically conductive probing tips 88. The electrically conductive probing tips 88 are electrically coupled to the electrically conductive contacts 30 on the Fabry-Perot optical cavity 10. The electrically conductive probing tips 88 may directly contact the electrically conductive contacts 30 but it is preferable that electrically conductive contacts 90 be formed on the upper surface of the probe contact substrate 84 that are electrically coupled to the probing tips 88. The electrically conductive contacts 90 on the probe contact substrate 84 electrically contact the electrically conductive contacts 30 on the Fabry-Perot optical cavity 10. A conductive adhesive, such as epoxy or the like, is applied to the contacts 30 and 90 for securing the probe contact substrate 84 to the Fabry-Perot optical cavity 10. Alternately, flexible type electrical contacts be disposed between the probing tips 88 and the contacts 30. The flexible type contacts may take the form of electrically conductive elastomers, flexible C-type string contacts, or the like. A mechanical registration element would attach the probe contact substrate 84 to the Fabry-Perot optical cavity 10. In a further embodiment, the apertures 86 and probing tips 88 may be replaced with protrusions extending from the bottom of the probe contact substrate 84 forming the probing contacts. Electrically conductive material, such as gold plated over a layer of chromium, is disposed on the bottom surfaces of the protrusions. Electrically conductive vias are formed in the probe contact substrate 84 to electrically couple the electrically conductive contacts on the protrusions to the top surface of the substrate 84.

The collimating lens 70, the Fabry-Perot optical cavity 10 and the probing contact substrate 84 are disposed within a non-conductive housing 92, formed from ABS plastic, poly-carbonate, poly-carbonate ABS, poly-phenylene sulfide or the like. The housing has a first cavity 94 for receiving the collimating lens 70 and a second cavity 96 for receiving the Fabry-Perot optical cavity 10 and the probe contact substrate 84. The housing 92 has an opening 98 extending from the top surface of the housing to the first cavity 94 to allow the optical fibers 72 and 74 to be connected to the collimating lens 70. The interface between the first and second cavities 94 and 96 defines a shoulder 100. A rib 102 is formed at the bottom of the housing 92 that protrudes into the second cavity 96 for supporting the probe contact substrate 84, the Fabry-Perot optical cavity 10 and the collimating lens 70. The first and second cavities 94 and 96 are sized to closely conform to the lateral dimensions of the collimating lens 70 and the probe contact substrate 84. Both cavities 94 and 96 are sized to provide excess vertical clearance for the collimating lens 70 and the probe contact substrate 84 so as to provide axial movement of the probing elements within the housing 92. A spring mechanism 104, in the form of elastomeric material, mechanical springs or the like, is provided in the gaps 106 between the housing 92 and the collimating lens 70 and the probe contact substrate 84. The housing 92 is disposed within a probing head shell that provides strain relief for the optical fibers 72 and 74 in the optical transmission system 56 and protection and support for the elements within the housing 92. The acoustic damping material 40 is applied to substantially all of the outer exposed surfaces of the Fabry-Perot optical cavity 10 and the probe contact substrate 84. Gaps are provided in the acoustic damping material 40 on the top and bottom surfaces of the Fabry-Perot optical cavity 10 for the optical signals leaving and entering the collimating lens 70 and the probing contacts 90 extending from the bottom of the probe contact substrate 84.

An acoustic damping material has been described for use on electro-optical material having an adhesive material combined with a ceramic crystalline material such that the acoustic impedance of the combined adhesive material and the ceramic crystalline material is substantially the same as the acoustic impedance of the electro-optic material. The acoustic damping material maybe used on a signal acquisition probe having a Fabry-Perot optical cavity made of electro-optic material and a probe contact substrate containing probing tips.

It will be obvious to those having skill in the art that many changes may be made to the details of the above-described embodiments of this invention without departing from the underlying principles thereof. The scope of the present invention should, therefore, be determined only by the following claims.

What is claimed is:

1. An acoustic damping material for electro-optic material having an acoustic impedance comprising:
    an adhesive material having an acoustic impedance substantially less than the acoustic impedance of the electro-optic material; and
    a yttrium-aluminum-garnet ceramic crystalline material combined with the adhesive material such that the acoustic impedance of the combined adhesive material and the yttrium-aluminum-garnet ceramic crystalline material is substantially the same as the acoustic impedance of the electro-optic material.

2. The acoustic damping material as recited in claim 1 wherein the adhesive material comprises an epoxy.

3. The acoustic damping material as recited in claim 1 wherein the adhesive material comprises an ultra-violet cured epoxy.

4. The acoustic damping material as recited in claim 1 wherein the adhesive material comprises a urethane.

5. The acoustic damping material as recited in claim 1 wherein the adhesive material comprises a silicone.

6. The acoustic damping material as recited in claim 1 wherein the adhesive material is an epoxy and the yttrium-aluminum-garnet has a volume in the range of 25% to 50%.

7. The acoustic damping material as recited in claim 6 wherein the yttrium-aluminum-garnet has a volume of 50%.

8. The acoustic damping material as recited in claim 1 further comprising an optical absorbing material for absorbing optical radiation.

9. The acoustic damping material as recited in claim 8 wherein the optical absorbing material comprises carbon black.

* * * * *